US012461472B2

(12) United States Patent
Koga

(10) Patent No.: US 12,461,472 B2
(45) Date of Patent: Nov. 4, 2025

(54) IMAGE FORMING APPARATUS WITH ENGAGEMENT MECHANISM OF APPARATUS MAIN BODY

(71) Applicant: CANON KABUSHIKI KAISHA, Tokyo (JP)

(72) Inventor: Satoshi Koga, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/753,462

(22) Filed: Jun. 25, 2024

(65) Prior Publication Data

US 2025/0004401 A1 Jan. 2, 2025

(30) Foreign Application Priority Data

Jun. 28, 2023 (JP) ................................ 2023-105936

(51) Int. Cl.
*G03G 15/20* (2006.01)
*G03G 21/16* (2006.01)

(52) U.S. Cl.
CPC ..... *G03G 15/2035* (2013.01); *G03G 15/2064* (2013.01); *G03G 21/1633* (2013.01); *G03G 21/1638* (2013.01); *G03G 21/1647* (2013.01); *G03G 21/1685* (2013.01)

(58) Field of Classification Search
CPC ........... G03G 15/2035; G03G 15/2064; G03G 21/1633; G03G 21/1638; G03G 21/1647; G03G 21/1685
See application file for complete search history.

(56) References Cited

U.S. PATENT DOCUMENTS

2010/0028044 A1* 2/2010 Matsuo .............. G03G 15/2035 399/122
2024/0126195 A1* 4/2024 Koyama ............ G03G 15/2064

FOREIGN PATENT DOCUMENTS

EP 2492759 A2 * 8/2012 ......... G03G 15/2032
JP 2003287973 A 10/2003
JP 2010032833 A 2/2010
JP 2011215207 A 10/2011
JP 2012177743 A 9/2012

* cited by examiner

*Primary Examiner* — Sophia S Chen
(74) *Attorney, Agent, or Firm* — Canon U.S.A., Inc., IP Division

(57) ABSTRACT

An image forming apparatus includes an apparatus main body having an engagement mechanism and a second opening and further includes a fixing unit having a pressure releasing mechanism. The engagement mechanism includes a first engagement portion. The pressure releasing mechanism includes a first engaged portion engaging with the first engagement portion. In a process in which a first opening/closing member is opened from a closed state, the first engagement portion positioned on a second opening side of the first engaged portion pushes the first engaged portion from the second opening side to reduce or release an urging force applied to a fixing nip portion. In a state where the first opening/closing member is closed, the first engagement portion and the first engaged portion are disengaged, and the first engagement portion is retreated from a path of the first engaged portion when a fixing unit is detached from the second opening.

8 Claims, 18 Drawing Sheets

IMAGE FORMING APPARATUS WITH ENGAGEMENT MECHANISM OF APPARATUS MAIN BODY

BACKGROUND

Field

The present disclosure relates to an image forming apparatus, and to a configuration in which, in a case where paper jam (hereinafter, jam) occurs, pressing force of a fixing device is released in conjunction with opening of a door to perform a jam recovery.

Description of the Related Art

An image forming apparatus, such as a printer and a facsimile, includes a fixing device that fixes a toner image formed on a sheet onto a sheet by applying heat and pressure to the toner image. The fixing device is configured such that a pressure member and a heating unit form a nip portion and configured to apply heat and pressure when the sheet passes through the nip portion, thereby fixing the toner image.

Japanese Patent Application Laid-Open No. 2010-032833 discusses a configuration in which the pressure in the nip portion of the fixing device is released by a gear train mechanism in conjunction with opening/closing of a door.

In the configuration discussed in Japanese Patent Application Laid-Open No. 2010-032833, a gear train is assembled between an arm member connected to the door and the fixing device, and the fixing device cannot be detached from the image forming apparatus unless gears are detached. Therefore, there is concern that detachment of the fixing device takes much time and effort during a maintenance service operation of the image forming apparatus.

SUMMARY

According to an aspect of the present disclosure, an image forming apparatus includes a fixing unit configured to fix a toner image formed on a sheet onto the sheet, wherein the fixing unit includes a heating unit configured to heat the sheet, a pressure member configured to come into pressure contact with the heating unit to form a fixing nip portion for performing fixation, an urging member configured to apply urging force to bring the pressure member and the heating unit into pressure contact with each other, and a pressure releasing mechanism configured to reduce or release the urging force applied to the fixing nip portion, and an apparatus main body configured to detachably house the fixing unit, wherein the apparatus main body includes a first opening/closing member provided to be openable/closable to a first opening of the apparatus main body, an engagement mechanism engaging with the pressure releasing mechanism and the first opening/closing member and operate in conjunction with opening/closing of the first opening/closing member, and a second opening for attachment/detachment of the fixing unit, wherein, in a state where the first opening/closing member is closed, the urging member applies the urging force to the fixing nip portion, and by the engagement mechanism moving in a process in which the first opening/closing member is opened from a closed state, the pressure releasing mechanism reduces or releases the urging force applied to the fixing nip portion, wherein the engagement mechanism includes a first engagement portion, and the pressure releasing mechanism includes a first engaged portion engaging with the first engagement portion, wherein, in the process in which the first opening/closing member is opened from the closed state, the first engagement portion positioned on a second opening side of the first engaged portion pushes the first engaged portion from the second opening side to reduce or release the urging force applied to the fixing nip portion, and wherein, in the state where the first opening/closing member is closed, the first engagement portion and the first engaged portion are disengaged, and the first engagement portion is retreated from a path of the first engaged portion when the fixing unit is detached from the second opening.

Further features of the present disclosure will become apparent from the following description of exemplary embodiments with reference to the attached drawings.

DESCRIPTION OF THE EMBODIMENTS

The present disclosure is directed to an image forming apparatus enabling replacement of the fixing device without impairing workability during detachment of the fixing device in a configuration in which a nip of the fixing device is released in conjunction with opening of a door.

Figure 1:
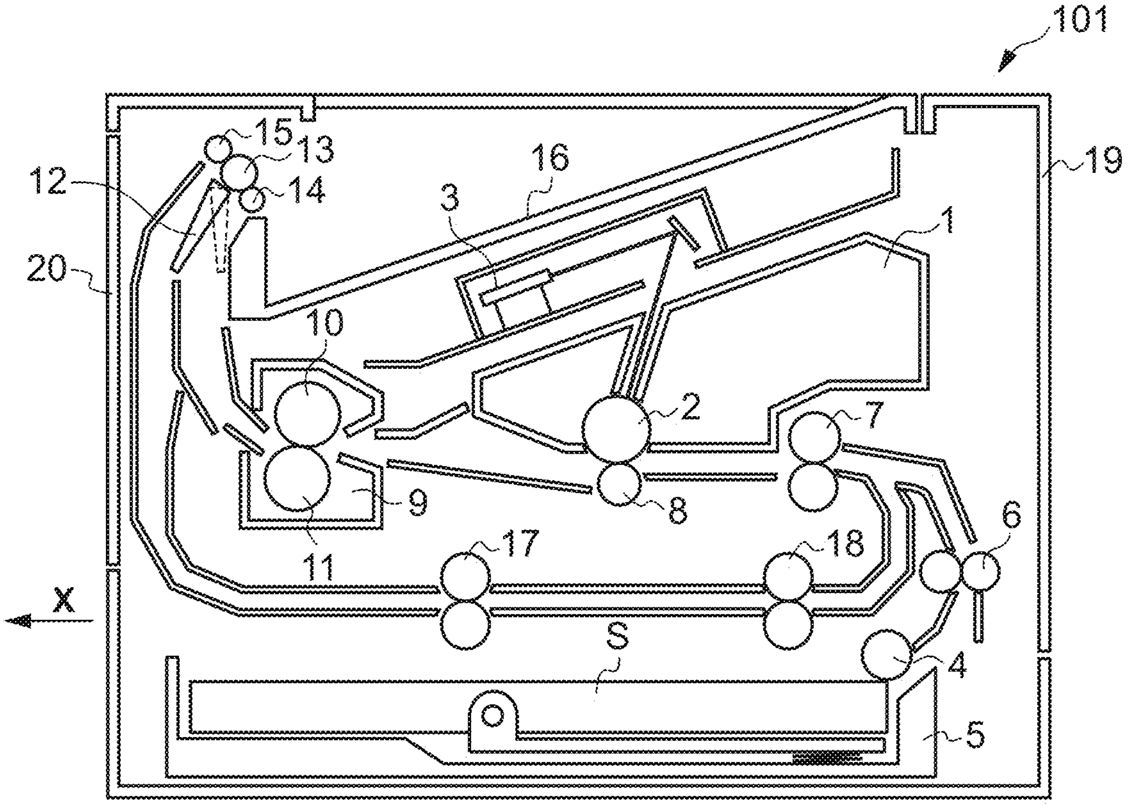
FIG. 1 is a cross-sectional view schematically illustrating a configuration of an image forming apparatus.

A first exemplary embodiment of the present disclosure is described below. FIG. 1 is a cross-sectional view schematically illustrating a configuration of a monochrome laser printer that is an example of an image forming apparatus. Note that dimensions, materials, shapes, relative arrangement, and the like of components described in the following exemplary embodiments should be appropriately changed depending on a configuration of an apparatus to which the present disclosure is applied and various kinds of conditions. Therefore, the scope of the present disclosure is not limited to them unless otherwise specified. The entire configuration of the image forming apparatus is described, and then, a configuration of a fixing device is described.

An image forming apparatus 101 illustrated in FIG. 1 mainly includes a sheet feeding unit, an image forming unit that forms an image on a sheet, a fixing unit, a sheet discharging/reversing unit, and a duplex conveyance unit. The image forming apparatus 101 includes a process cartridge 1 attachable to and detachable from an apparatus main body. The process cartridge 1 is a process unit for forming a toner image on a sheet by using an electrophotographic process, and includes a photosensitive drum 2 and process units (not illustrated) such as a development unit and a charging roller.

A scanner unit 3 is disposed above the process cartridge 1 in a vertical direction, and performs exposure based on an image signal on the photosensitive drum 2. The photosensitive drum 2 is charged to a potential of a predetermined negative polarity by the charging roller (not illustrated). Then, the scanner unit 3 scans the photosensitive drum 2 with laser light. As a result, an electrostatic latent image is formed on the photosensitive drum 2. Then, the development unit (not illustrated) in the process cartridge 1 causes toner to adhere to the electrostatic latent image on the photosensitive drum 2, thereby forming a toner image.

The sheet feeding unit includes a sheet feeding roller 4 inside the image forming apparatus 101, and a sheet feeding cassette 5 that is attachable to and detachable from the image forming apparatus 101 and houses sheets. Sheets S housed in the sheet feeding cassette 5 are separated and fed one by one from the sheet feeding cassette 5 by the sheet feeding roller 4, which is rotated by power of a sheet feeding driving unit (not illustrated). A fed sheet S is conveyed to a registration roller pair 7 by a conveyance roller pair 6, is subjected to skew correction by the registration roller pair 7, and is then conveyed to a transfer unit. In the transfer unit, a bias of a positive polarity is applied by a bias application unit (not illustrated) to a transfer roller 8. As a result, the toner image on the photosensitive drum 2 is transferred to the sheet S conveyed to the transfer unit.

The sheet S to which the toner image has been transferred is conveyed to a fixing device (fixing unit) 9 provided on a downstream side of the transfer unit in a conveyance direction. The fixing device 9 fixes the toner image transferred to the sheet S onto the sheet S. The fixing device 9 includes a heating unit 10 provided with a heater as a heating means (not illustrated), and a pressure roller 11 as a pressure member that comes into pressure contact with the heating unit 10 and is rotated about a rotation axis. The sheet S on which the toner image has been formed is nipped and conveyed by a fixing nip portion N formed by the heating unit 10 and the pressure roller 11, and the toner image is fixed to a surface of the sheet S by receiving heat and pressure.

The sheet S onto which the toner image has been fixed is conveyed from the fixing device 9 to the sheet discharging/reversing unit. The sheet discharging/reversing unit includes a triple roller including a discharge roller 13, a discharge roller 14, and a reversing roller 15, and a duplex flapper 12. In the case of simplex image formation (simplex print), the duplex flapper 12 stands by at a position to guide the sheet S toward a discharge nip portion formed by the discharge roller 13 and the discharge roller 14, and the sheet S is discharged onto a discharge tray 16 by the discharge roller 13 and the discharge roller 14.

In the case of duplex image formation (duplex print), the duplex flapper 12 stands by at a position to guide the sheet S toward a reversing nip portion formed by the discharge roller 13 and the reversing roller 15, and the sheet S is conveyed to the reversing nip portion by the fixing device 9. The discharge roller 13 is reversely rotated by a rotation-direction switching unit (not illustrated) at a timing when a trailing edge of the sheet S reaches a predetermined position. As a result, the sheet S passes through a duplex conveyance roller pair 17 and a re-feeding roller pair 18 with the trailing edge leading, and is retransmitted to the registration roller pair 7 in a state where the front and back sides of the sheet S are inverted. Then, the duplex flapper 12 stands by at the position to guide the sheet S toward the discharge nip portion formed by the discharge roller 13 and the discharge roller 14. Further, in a manner similar to the simplex print, the toner image on the photosensitive drum 2 is transferred to a second surface of the sheet S and is fixed by the fixing device 9. The sheet S is then discharged onto the discharge tray 16 by the discharge roller 13 and the discharge roller 14, and the duplex print is thus completed. In a case where the sheet S is jammed in the fixing device 9 during conveyance of the sheet S, a jam recovery can be performed by opening a front door (first opening/closing member) 19 covering a first opening or a rear door (second opening/closing member) 20 covering a second opening, depending on a position where the jam has occurred.

Figure 2A:
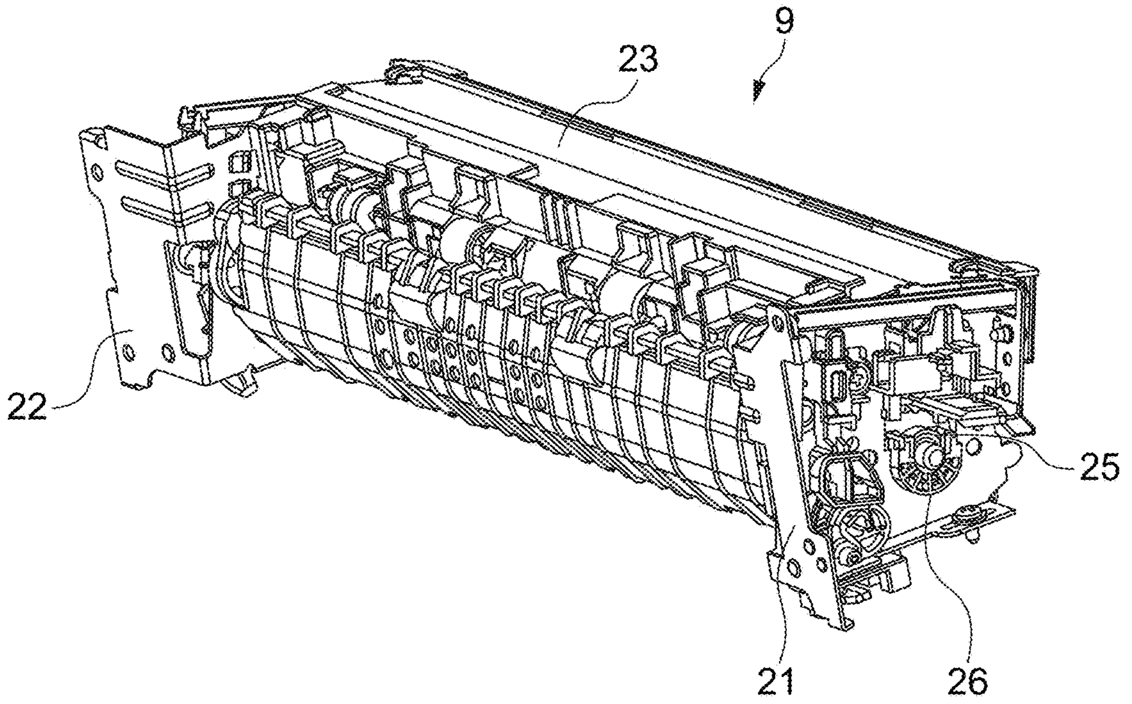
FIGS. 2A and 2B are schematic views of a fixing device.
Figure 2B:
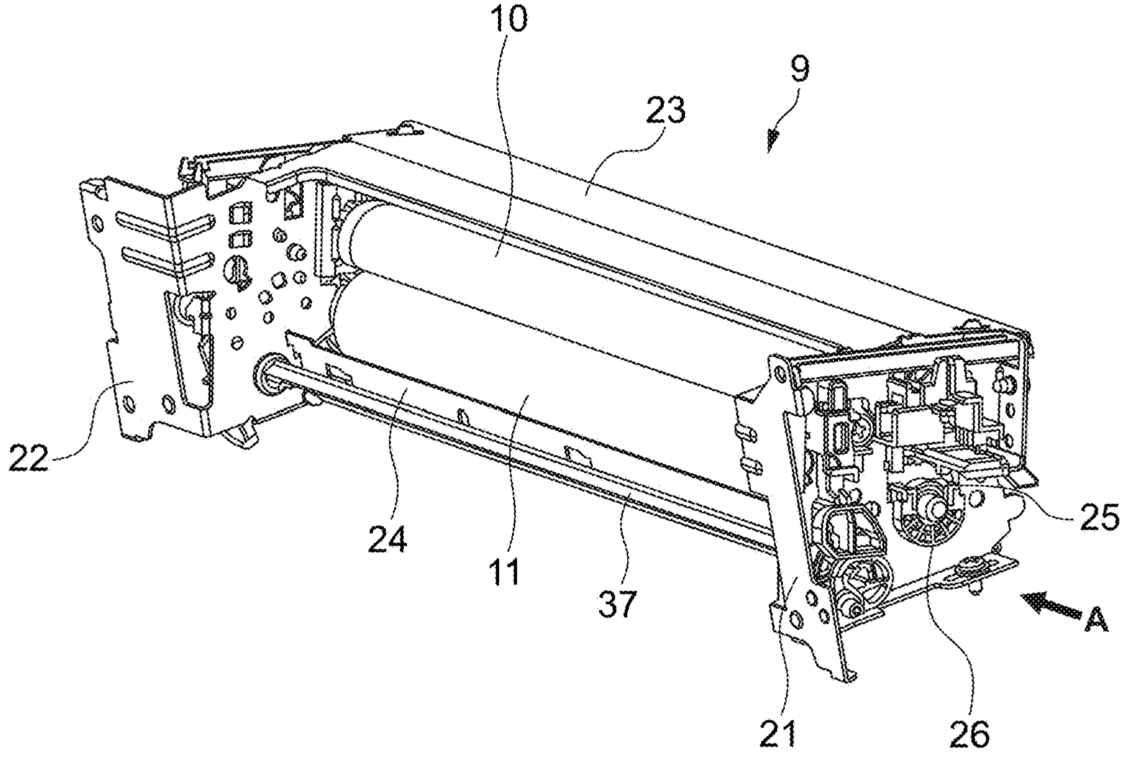

Next, the fixing device 9 is described with reference to FIG. 2A to FIG. 4B. FIG. 2A is a schematic view of the fixing device 9 according to the first exemplary embodiment, and FIG. 2B is a schematic view of a state where a sheet conveyance guide is removed from the fixing device 9. The fixing device 9 is detachably housed in the image forming apparatus 101. The fixing device 9 includes side plates 21 and 22, an upper stay 23, and a lower stay 24. The pressure roller 11 as the pressure member is rotatably supported relative to the side plates 21 and 22 via respective ball bearings 25 and bearings 26. The heating unit 10 is attached to the side plates 21 and 22 via respective flange members 28. The pressure roller 11 is disposed to face the heating unit 10 to form the fixing nip portion N where the sheet S is nipped.

Figure 3:
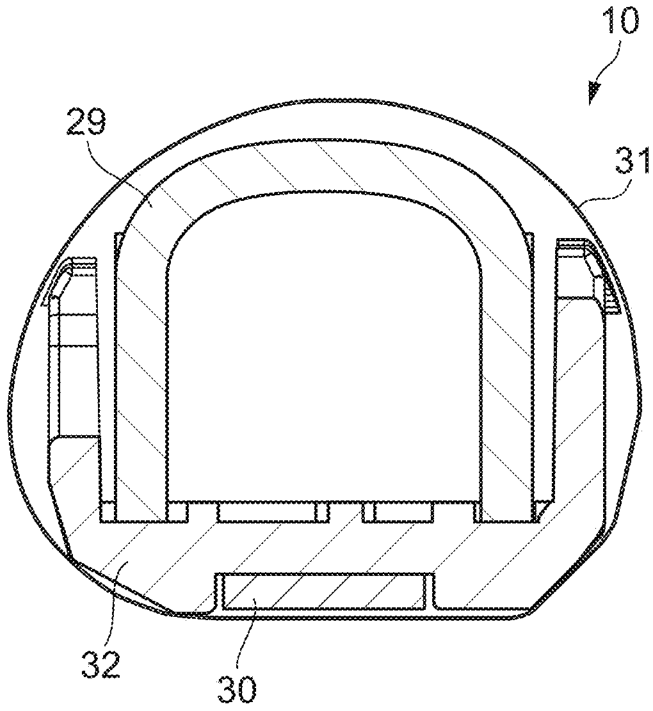
FIG. 3 is a cross-sectional view of a heating unit.

FIG. 3 is a cross-sectional view illustrating the heating unit 10. The heating unit 10 mainly includes a heater 30, a pressure stay 29, a fixing film 31, and a film guide 32. The fixing film 31 has a cylindrical shape (sleeve shape), is flexible, and is externally fitted to the film guide 32. The heater 30 that is a heating source is fitted and fixed into a recessed groove provided in a longitudinal direction of the film guide 32. The pressure stay 29 has a substantially U-shaped cross-section, is disposed inside the film guide 32, and pressurizes the film guide 32 and the heater 30 toward the pressure roller 11 when receiving a pressing force.

Figure 4A:
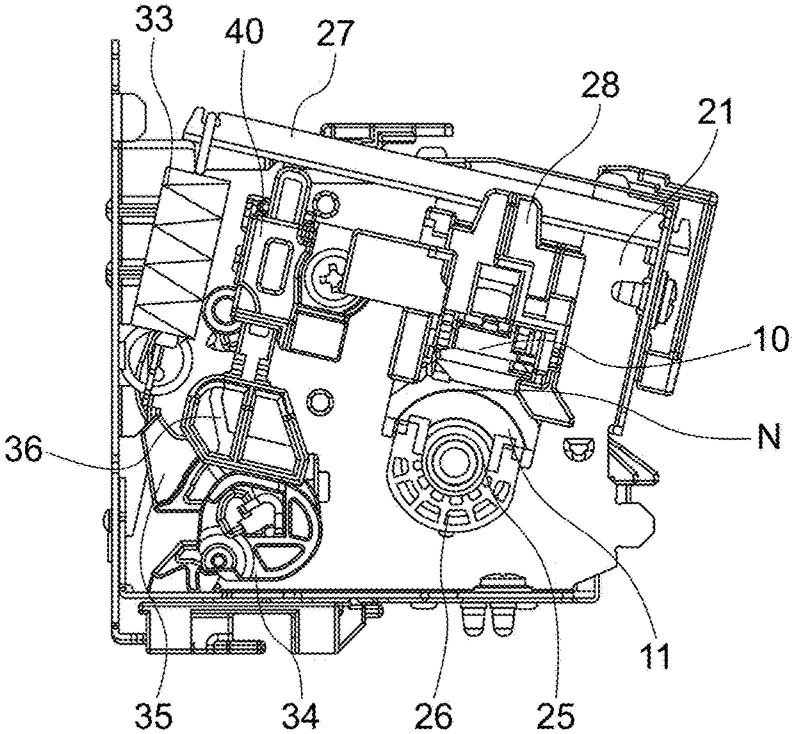
FIGS. 4A and 4B are schematic views illustrating a pressure releasing mechanism of the fixing device.
Figure 4B:
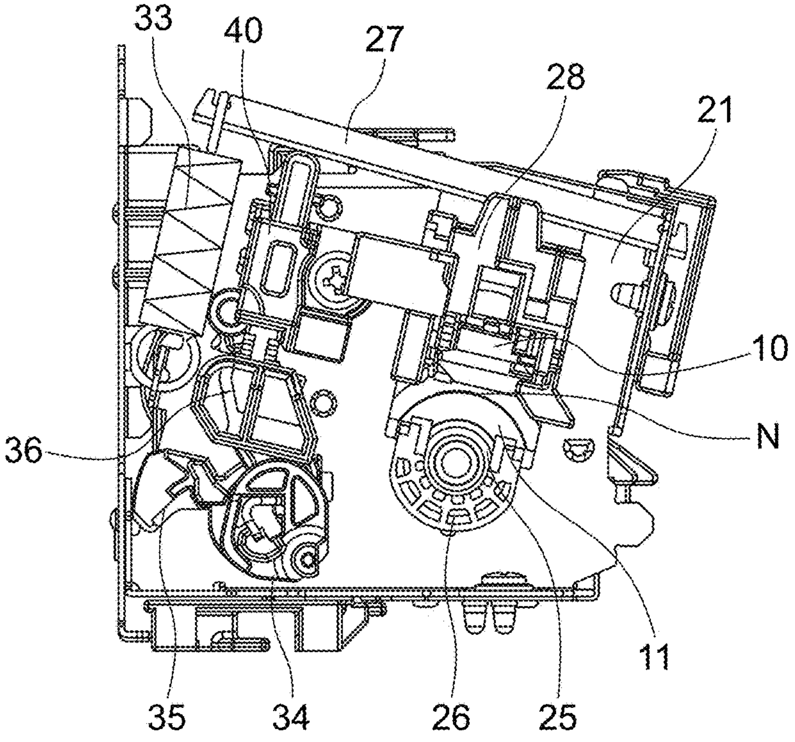

FIGS. 4A and 4B are side views as viewed from a direction A in FIG. 2B, and are schematic views of a pressure mechanism and a pressure releasing mechanism in the fixing device 9. FIG. 4A is a diagram illustrating a contact state where the heating unit 10 is urged toward the pressure roller 11, and a predetermined pressing force is accordingly applied thereto. FIG. 4B is a diagram illustrating a non-pressurized state where the pressing force of the heating unit 10 toward the pressure roller 11 is reduced as compared with the contact state (or the pressing force is zero). By a pressurizing spring 33 urging a pressure plate 27, an urging force is transmitted to the heating unit 10 via the flange member 28, and by the heating unit 10 being urged toward the pressure roller 11, the predetermined pressing force is applied to the fixing nip portion N.

Figure 5A:
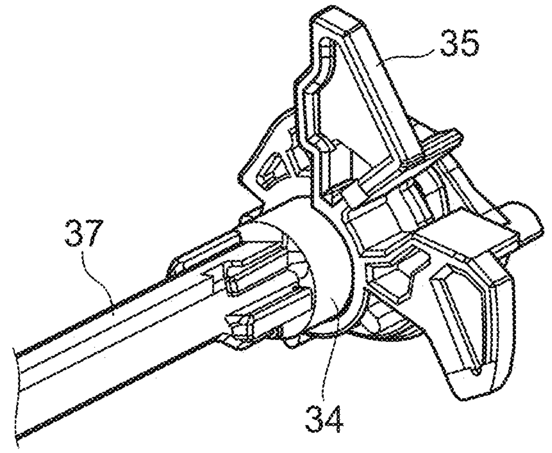
FIGS. 5A and 5B are schematic views of a front cam, a rear cam, and a shaft member.
Figure 5B:
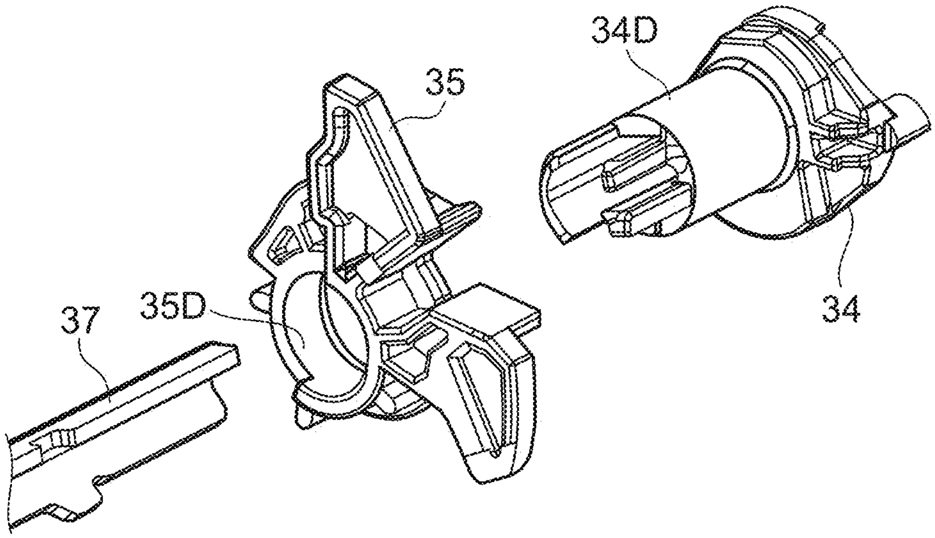

The pressure releasing mechanism of the fixing device 9 includes a front cam (cam member) 34 that moves in conjunction with opening/closing of the front door 19, and a rear cam 35 pivoting in conjunction with opening/closing of the rear door 20. The pressure releasing mechanism of the fixing device 9 further includes a pressure releasing arm 36 for switching between a pressurized state and a non-pressurized state of the fixing nip portion N by lifting the pressure plate 27, and a pressure releasing arm holder 40 that holds the pressure releasing arm 36. In the fixing device 9, the front cam 34 and the rear cam 35 pivot in conjunction with switching of the front door 19 and the rear door 20, respectively, from a closed state to an open state, and the state is switched from the contact state illustrated in FIG. 4A to the non-pressurized state illustrated in FIG. 4B. FIG. 4B illustrates the non-pressurized state where both the front door 19 and the rear door 20 are open, and both the front cam 34 and the rear cam 35 have pivoted. FIGS. 5A and 5B are diagrams illustrating a relationship among the front cam 34, the rear cam 35, and a shaft member 37. As illustrated in FIGS. 5A and 5B, the front cam 34 and the rear cam 35 are held by the shaft member 37 in such a manner that a hole portion 35D of the rear cam 35 engages with a shaft portion 34D of the front cam 34.

Figure 6:
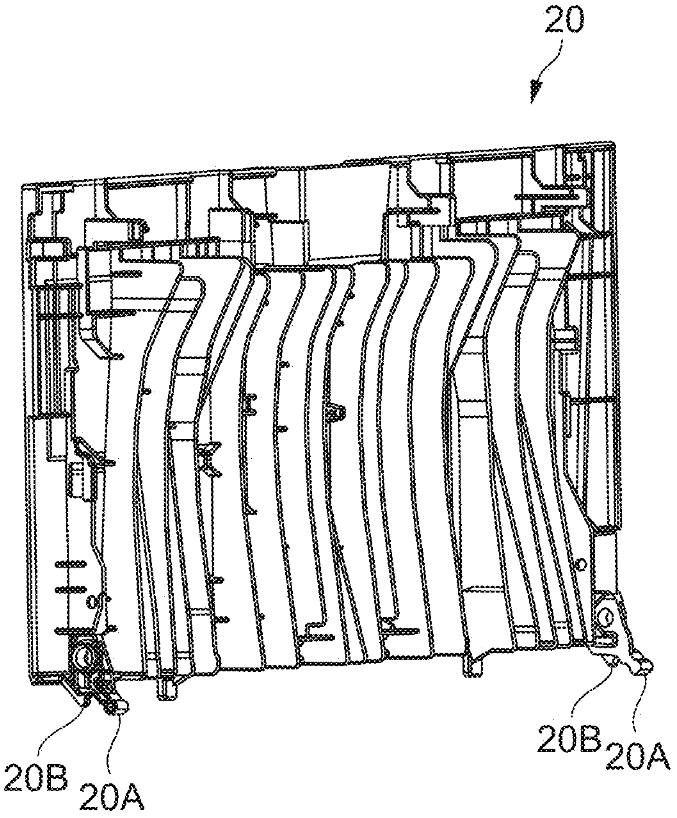
FIG. 6 is an appearance perspective view of a rear door.
Figure 7A:
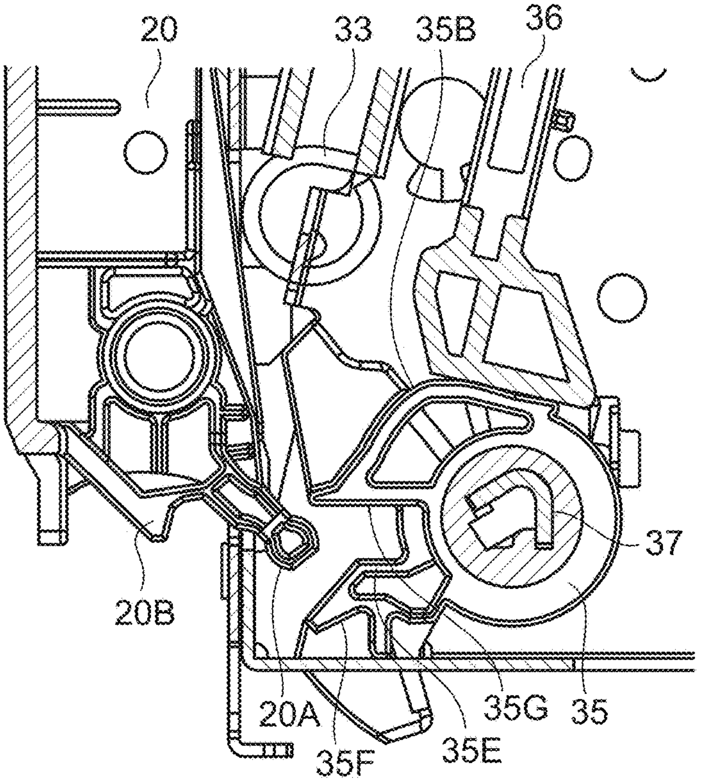
FIGS. 7A and 7B are explanatory views illustrating operation of the pressure releasing mechanism of the fixing device caused by opening/closing of the rear door.
Figure 7B:
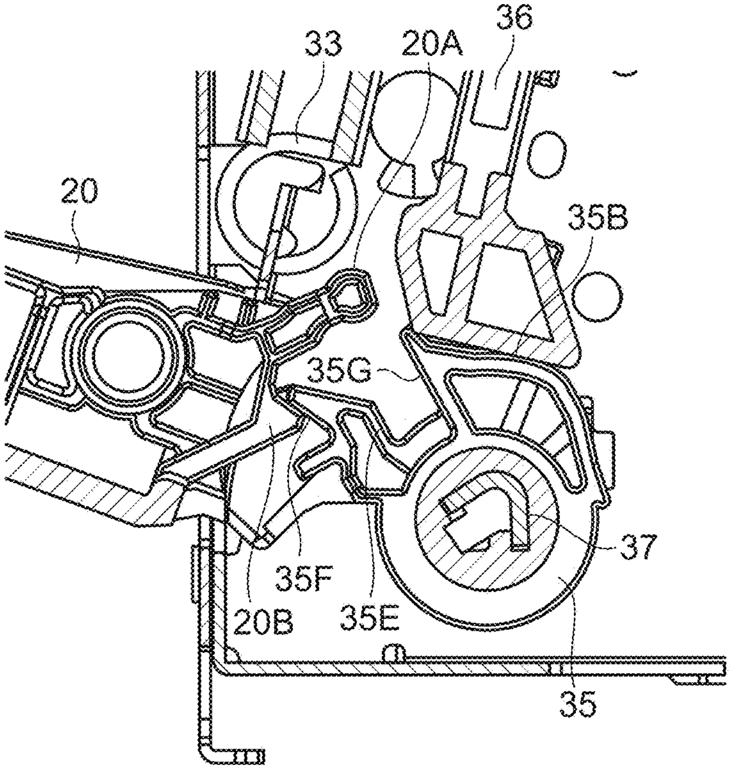

As a result, the front cam 34 and the rear cam 35 are independently pivotable. When one of the front door 19 and the rear door 20 is in the open state, only the cam corresponding to the open door pivots. Front cams 34, rear cams 35, pressure releasing arms 36, and pressure releasing arm holders 40 are disposed at both ends of the fixing device 9 in a longitudinal direction, and the front cams 34 disposed at both of the ends are connected by the shaft member 37. The front cam 34 and the rear cam 35 each have a cam surface for lifting up the pressure releasing arm 36, and pivot to put the fixing device 9 into the non-pressurized state. Since the front cam 34 and the rear cam 35 are independently pivotable, the fixing device 9 is put into the non-pressurized state when at least one of the front cam 34 and the rear cam 35 pivots. In other words, when at least one of the front door 19 and the rear door 20 is in the open state, the fixing device 9 is in the non-pressurized state. Next, pressure release in conjunction with opening of the rear door 20 is described with reference to FIG. 6. FIG. 6 is a perspective view illustrating the rear door 20. FIGS. 7A and 7B are explanatory views illustrating operation of the pressure releasing mechanism of the fixing device 9 when the rear door 20 is opened or closed, and are cross-sectional views taken along the rear cam 35. As illustrated in FIG. 6, the rear door 20 includes a first rear door engagement portion 20A and a second rear door engagement portion 20B for releasing pressure of the fixing device 9, at each end thereof. This is because, as described above, the rear cams 35 disposed at both of the ends of the fixing device 9 in the longitudinal direction are independently pivotable from each other. The first rear door engagement portion 20A and the second rear door engagement portion 20B can cause the rear cams 35 to pivot at both of the ends.

Subsequently, operation of the pressure releasing mechanism of the fixing device 9 at the time of opening/closing the rear door 20 is described with reference to FIGS. 7A and 7B. FIG. 7A is a diagram when the rear door 20 is in the closed state and the fixing nip portion N is in the pressurized state illustrated in FIG. 4A. FIG. 7B is a diagram when the rear door 20 is in the open state and the fixing nip portion N is in the non-pressurized state illustrated in FIG. 4B. When the rear door 20 starts to open, the first rear door engagement portion 20A of the rear door 20 comes into contact with a surface 35G of the rear cam 35. When the rear door 20 is further opened, the second rear door engagement portion 20B provided on the rear door 20 comes into contact with a surface 35F of the rear cam 35. As a result, the rear cam 35 pivots in a clockwise direction in FIGS. 7A and 7B in conjunction with pivoting of the rear door 20 in an opening direction. Finally, the rear cam 35 stops pivoting at a position where an arc portion 35B, which is coaxial with a pivot center of the rear cam 35, is in contact with the pressure releasing arm 36 as illustrated in FIG. 7B. In this state, the second rear door engagement portion 20B and the surface 35F of the rear cam 35 are in contact with each other. In a case where the rear door 20 is moved from the open state to the closed state, the first rear door engagement portion 20A of the rear door 20 comes into contact with a surface 35E of the rear cam 35 to cause the rear cam 35 to pivot in a counterclockwise direction. Finally, the fixing device 9 is put into the contact state illustrated in FIG. 4A.

Figure 8:
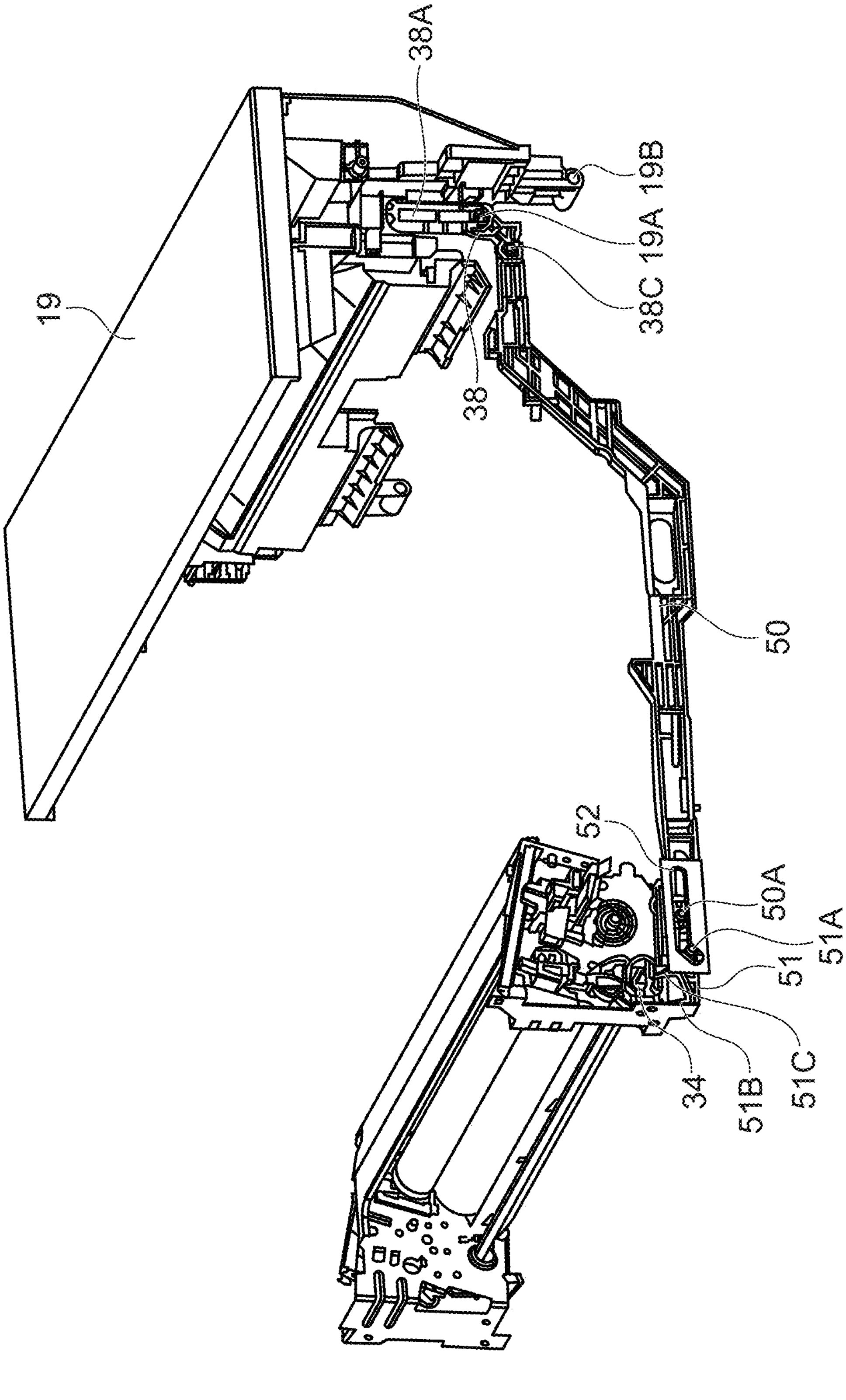
FIG. 8 is a perspective view illustrating an engagement mechanism engaging with the pressure releasing mechanism of the fixing device in conjunction with a front door.

Next, pressure release in conjunction with opening of the front door 19 is described with reference to FIG. 8 to FIG. 12. FIG. 8 is a perspective view illustrating an engagement mechanism engaging with the pressure releasing mechanism of the fixing device 9 in conjunction with the front door 19. The engagement mechanism is a mechanism for performing pressurization and releasing pressurization of the fixing nip portion N in conjunction with opening/closing of the front door 19. The engagement mechanism includes a front door engagement member 38 engaging with the front door 19, a slide member 50 movable in a horizontal direction, and a cam engagement member (swing member) 51 engaging with the front cam 34 to cause the front cam 34 to pivot. In the present exemplary embodiment, the cam engagement member 51 is coupled to the slide member 50 to be pivotable about an axis parallel to the rotation axis of the pressure roller 11. However, the present exemplary embodiment is not limited to the configuration, and another member may be pivotably coupled between the cam engagement member 51 and the slide member 50.

The front door engagement member 38 is pivotably held by the slide member 50, and has a long hole 38A. A boss 19A extending from the front door 19 in a rotation axis direction of the front door 19 engages with the long hole 38A. The cam engagement member 51 is pivotably held by a shaft 50A of the slide member 50, and includes a guide boss 51A, a first engagement portion 51B provided on a front end side of a U-shaped portion of the cam engagement member 51 for engagement with the front cam 34, and a second engagement portion 51C provided on a rear end side of the U-shaped portion. The front cam 34 includes a boss 34C for engagement with the first engagement portion 51B and the second engagement portion 51C. The guide boss 51A and the boss 34C of the front cam 34 are provided in parallel with each other, and the guide boss 51A engages with a guide groove 52 provided in the image forming apparatus main body. The slide member 50 is held by a part (not illustrated) to be movable in the horizontal direction in the image forming apparatus main body.

Figure 9A:
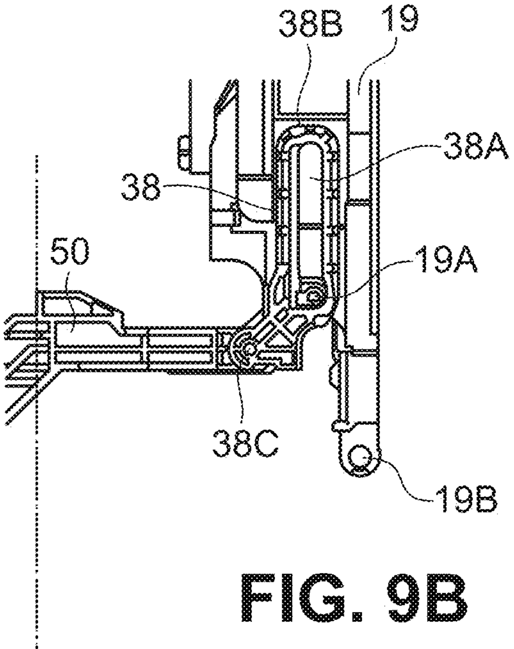
FIGS. 9A, 9B, and 9C are explanatory views illustrating operation of the front door and the engagement mechanism on a front side of an image forming apparatus main body.
Figure 9B:
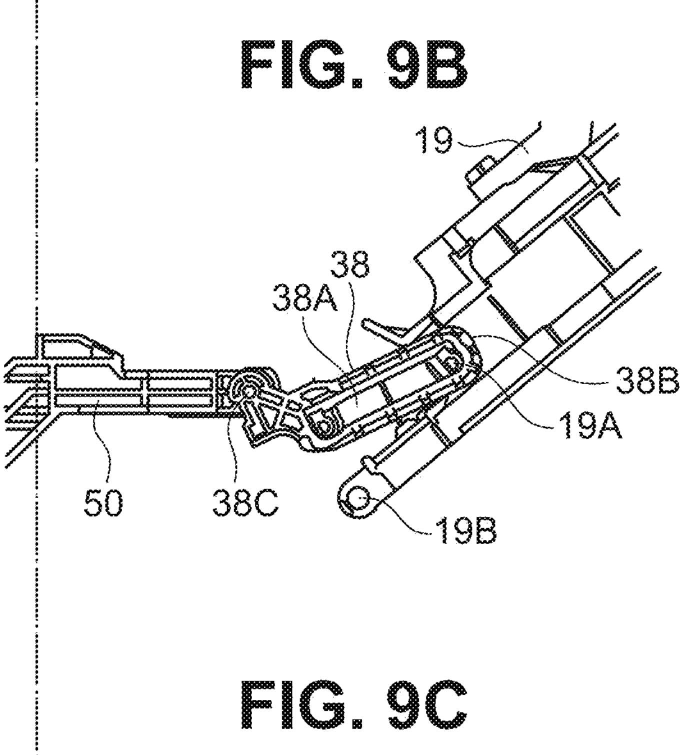
Figure 9C:
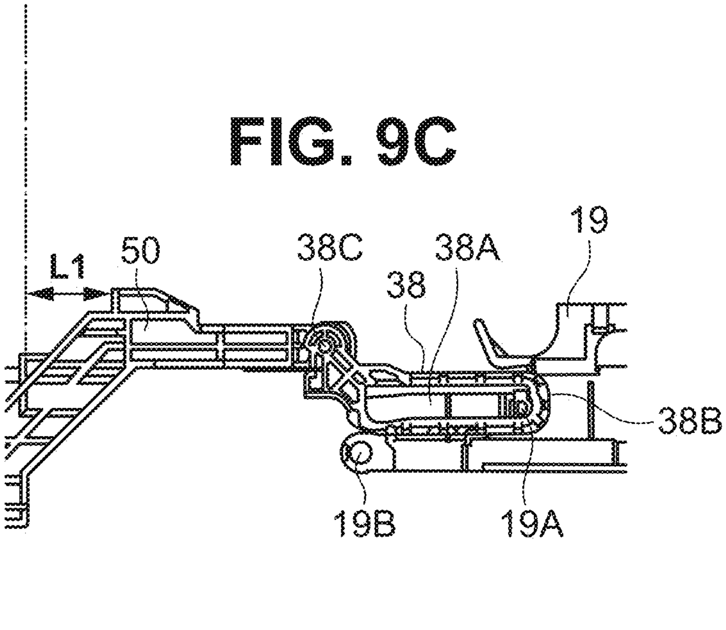

Subsequently, operation of the engagement mechanism in conjunction with the opening/closing operation of the front door 19 is described with reference to FIG. 9A to FIG. 13. FIGS. 9A to 9C are explanatory views illustrating operation of the front door 19 and the engagement mechanism on the front side of the image forming apparatus main body. FIG. 9A is a diagram when the front door 19 is in the closed state, FIG. 9B is a diagram in a state where the slide member 50 starts to move horizontally, and FIG. 9C is a diagram when the front door 19 is in the open state. When the front door 19 starts to pivot in the clockwise direction in FIG. 9A about a rotary shaft 19B from the closed state, the boss 19A slides and moves in the long hole 38A, and the front door engagement member 38 pivots about a rotary shaft 38C in the clockwise direction. At this time, the slide member 50 does not horizontally move. Then, an end surface 38B of the long hole 38A and the boss 19A of the front door 19 come into contact with each other, which leads to the state illustrated in FIG. 9B. When the front door 19 further pivots, the boss 19A and the end surface 38B of the long hole 38A move while being in contact with each other, and the slide member 50 horizontally moves a predetermined distance L1. Finally, the slide member 50 moves to a position in the open state illustrated in FIG. 9C.

Figure 10:
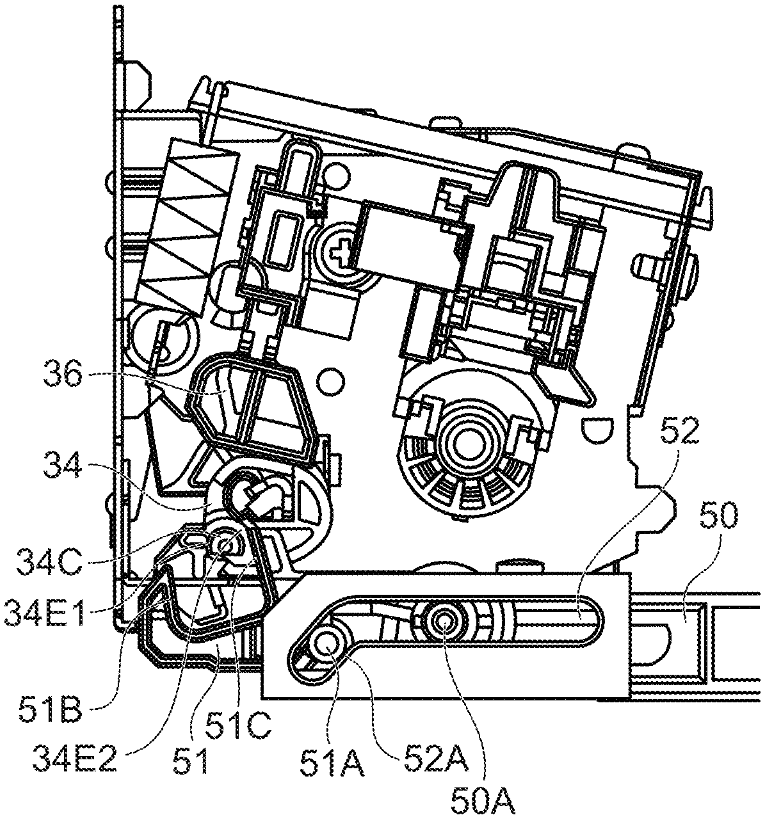
FIG. 10 is an explanatory view illustrating operation of a cam engagement member and the pressure releasing mechanism (when the front door is in a closed state).
Figure 11:
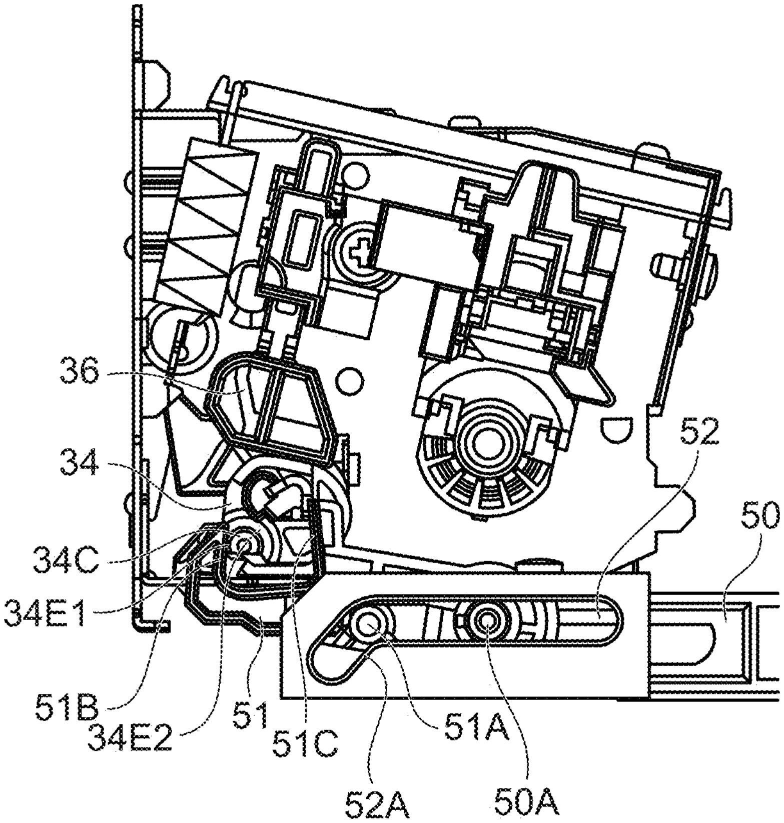
FIG. 11 is an explanatory view illustrating the operation of the cam engagement member and the pressure releasing mechanism (in a state where the cam engagement member and the front cam start engagement).
Figure 12:
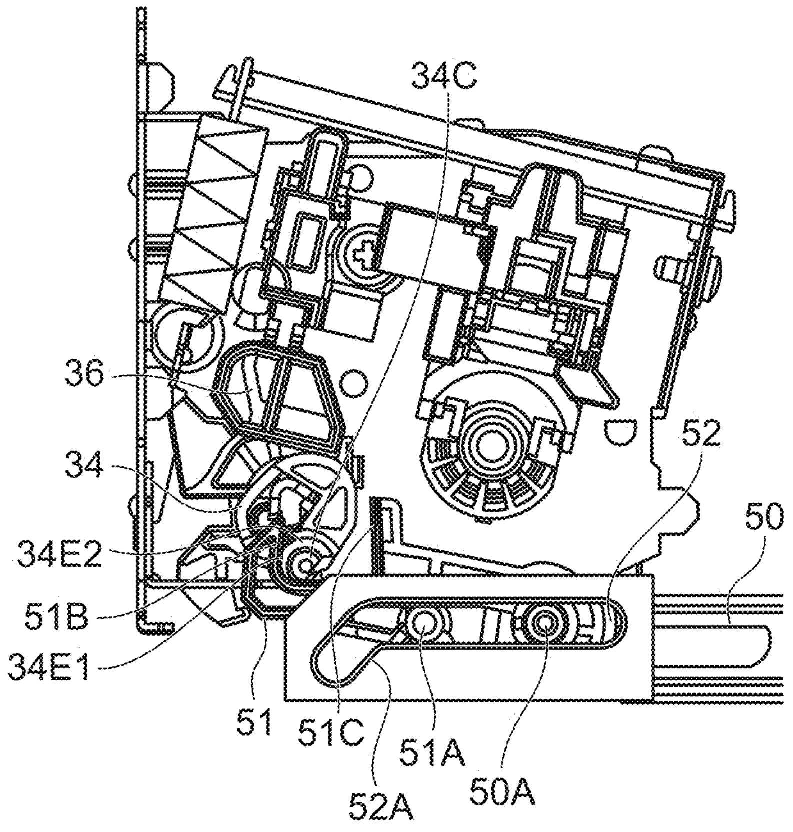
FIG. 12 is an explanatory view illustrating the operation of the cam engagement member and the pressure releasing mechanism (in a process of releasing pressure).

FIG. 10 is an explanatory view illustrating operation of the cam engagement member 51 and the pressure releasing mechanism. FIG. 10 is a diagram when the front door 19 is in the closed state, and FIG. 11 to FIG. 13 sequentially illustrate operation of the cam engagement member 51 and the pressure releasing mechanism in a process of opening the front door 19. As illustrated in FIG. 10, when the front door 19 is in the closed state, the first engagement portion 51B of the cam engagement member 51 is at a position separated from the boss 34C of the front cam 34. As the front door 19 opens, the slide member 50 horizontally moves. Then, the guide boss 51A of the cam engagement member 51 moves along an inclined surface 52A of the guide groove 52, and the cam engagement member 51 accordingly moves while pivoting about a shaft 50A, which is an engagement portion with the slide member 50. As a result, the first engagement portion 51B moves upward, and the first engagement portion 51B comes into contact with a first engaged portion 34E1, which is a left surface of the boss 34C of the front cam 34 in the drawing, from the second opening side, which leads to a state illustrated in FIG. 11. When the slide member 50 further horizontally moves, the guide boss 51A of the cam engagement member 51 moves along a horizontal portion of the guide groove 52, and the cam engagement member 51 horizontally moves integrally with the slide member 50. At this time, the first engagement portion 51B of the cam engagement member 51 causes the front cam 34 to pivot, which leads to a state illustrated in FIG. 12.

Figure 13:
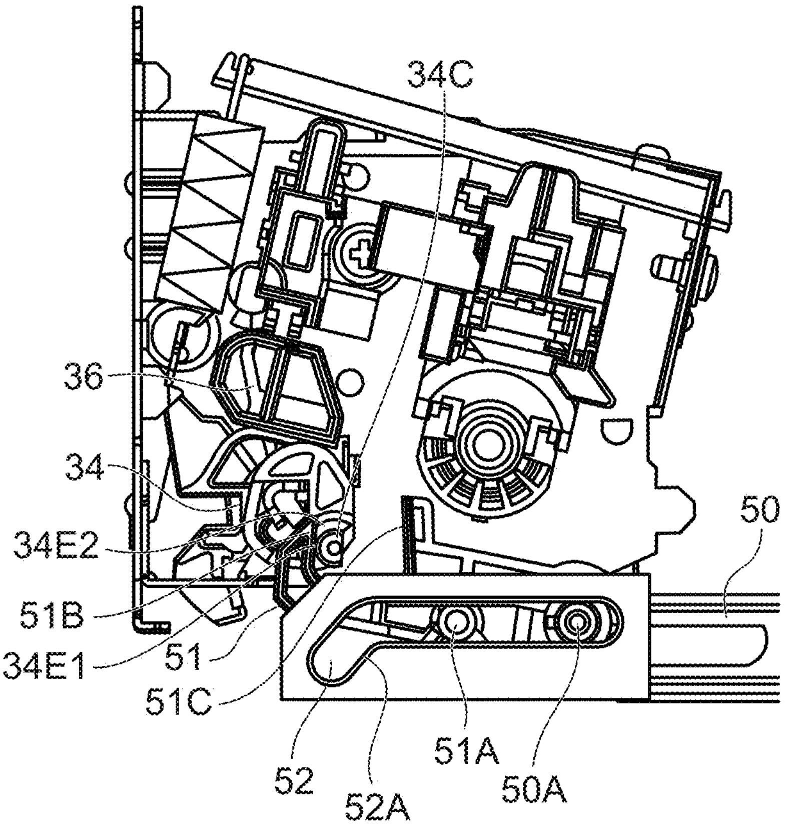
FIG. 13 is an explanatory view illustrating the operation of the cam engagement member and the pressure releasing mechanism (when the front door is in an open state).

Finally, the slide member 50 completes moving the predetermined distance L1, which leads to the non-pressurized state illustrated in FIG. 13.

In a case where the front door 19 is moved from the open state to the closed state, the cam engagement member 51 performs movement opposite to the movement described so far. A second engaged portion 34E2, which is a right surface of the boss 34C of the front cam 34 in the drawing, is arranged on the second opening side of the second engagement portion 51C of the cam engagement member 51. In the process in which the front door 19 moves from the open state to the closed state, the second engagement portion 51C of the cam engagement member 51 pushes the second engaged portion 34E2 of the front cam 34 toward the second opening, which causes the front cam 34 to pivot, and an urging force is accordingly applied to the fixing nip portion N. As illustrated in FIG. 10, when the front door 19 is in the closed state, the first engagement portion 51B of the cam engagement member 51 and the second engaged portion 34E2 of the front cam 34 are not in contact with each other. Note that, when the front door 19 is in the closed state, the cam engagement member 51 may move such that the second engagement portion 51C and the boss 34C come into contact with each other. The exemplary embodiment in which the boss 34C includes the first engaged portion 34E1 and the second engaged portion 34E2 is described; however, the first engaged portion 34E1 and the second engaged portion 34E2 may be provided on different boss portions.

Figure 14A:
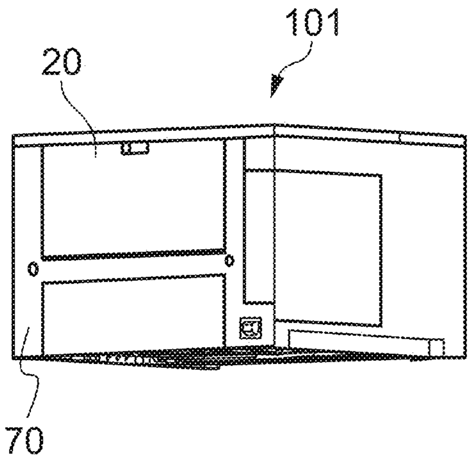
FIGS. 14A, 14B, 14C, and 14D are explanatory views illustrating a method of detaching the rear door.
Figure 14B:
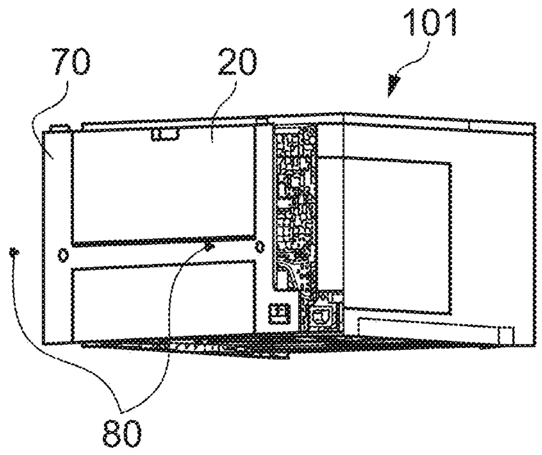
Figure 14C:
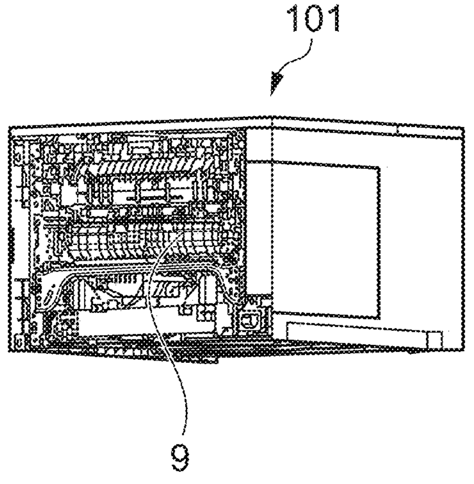
Figure 14D:
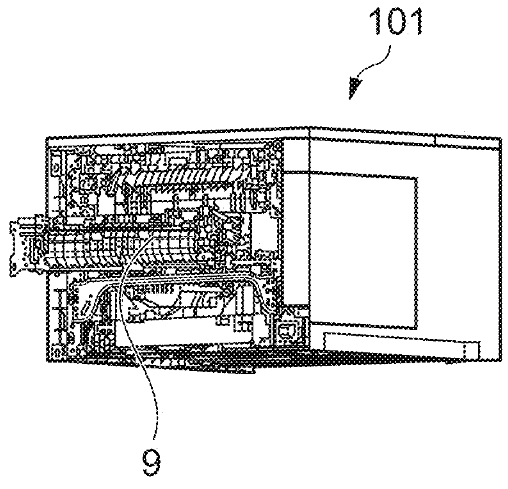

Subsequently, a procedure for detaching the fixing device 9 is described. FIG. 14A is a perspective view of the image forming apparatus 101 as viewed from a left rear surface, FIG. 14B is an explanatory view illustrating a method of detaching the rear door 20, FIG. 14C is a perspective view of the image forming apparatus 101 in a state where the rear door 20 has been detached, and FIG. 14D is an explanatory view illustrating a method of detaching the fixing device 9. The rear door 20 is pivotably supported by a rear cover 70 illustrated in FIG. 14A. After fastening screws 80 are removed, the rear door 20 and the rear cover 70 are integrally detached as illustrated in FIG. 14B. As a result, a user can access the fixing device 9 to attach and detach the fixing device 9.

Figure 15A:
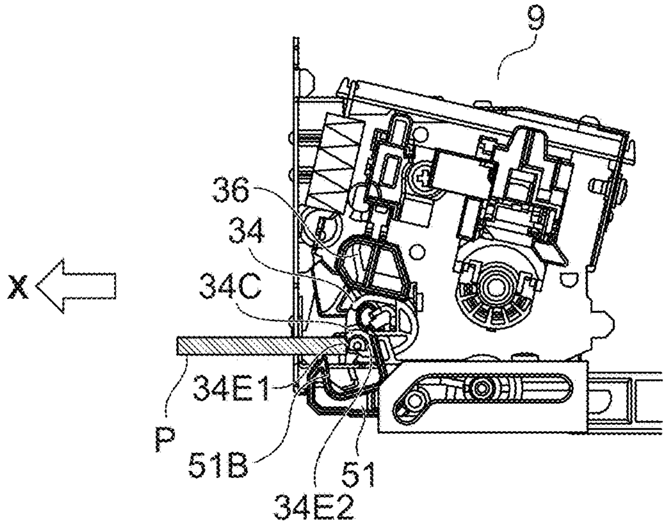
FIGS. 15A, 15B, and 15C are explanatory views illustrating an attachment/detachment locus of the fixing device according to the first exemplary embodiment.
Figure 15B:
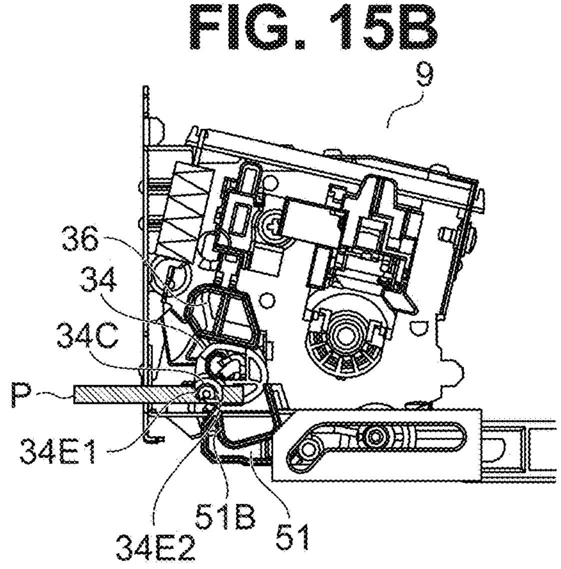
Figure 15C:
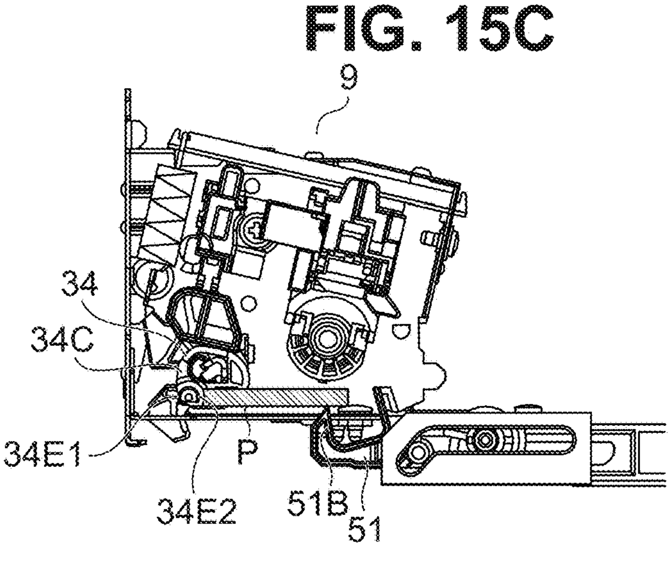

As described above, in FIG. 10 illustrating the closed state of the front door 19, the first engagement portion 51B is at a position retreated from a path on which the first engaged portion 34E1 moves when the fixing device 9 is detached from the image forming apparatus 101. Thus, as illustrated in FIGS. 15A to 15C, the fixing device 9 is detachable in an X direction. The path on which the first engaged portion 34E1 moves is a path P illustrated in FIGS. 15A to 15C, and the first engaged portion 34E1 moves toward the front as viewed from the second opening side. The fixing device 9 is replaceable without the user having to disengage the engagement portion between the engagement mechanism and the fixing device 9 and without impairing usability.

The pressure releasing mechanism according to the present exemplary embodiment operates in conjunction with the front door 19 and the rear door 20 independently from each other. Therefore, regardless of whether the pressure releasing mechanism operating in conjunction with the rear door 20 is in the pressurized state or the non-pressurized state, the fixing device 9 can be attached or detached while the front door 19 is in the closed state. Further, in the present exemplary embodiment, the first engagement portion 51B is at the position completely retreated from the path of the first engaged portion 34E1 when the fixing device 9 is detached from the image forming apparatus 101. However, the first engagement portion 51B may not be at the position completely retreated from the path. By the first engaged portion 34E1 pushing the first engagement portion 51B, the first engagement portion 51B can move by an amount of a clearance for the engagement portion between parts constituting the engagement mechanism. In other words, the configuration may be such that, when the fixing device 9 is detached from the image forming apparatus 101, the first engaged portion 34E1 pushes the first engagement portion 51B so that the first engagement portion 51B is retreated from the path of the first engaged portion 34E1.

In the present exemplary embodiment, the configuration including, as the engagement mechanism that engages with the fixing device 9 and operates in conjunction with the front door 19, three parts, namely the front door engagement member 38, the slide member 50, and the cam engagement member 51, has been described. However, the number of parts constituting the engagement mechanism is not limited to three. Thus, the functions, materials, shapes, arrangement, and the like of the components described in the above-described exemplary embodiment do not limit the present disclosure and can be appropriately changed within the spirit of the present disclosure, unless otherwise specified.

A second exemplary embodiment of the present disclosure is described with reference to FIGS. 16A to 17C. The parts the same as or equivalent to the parts according to the first exemplary embodiment are denoted by the same reference numerals, and detailed descriptions of the parts are omitted. The engagement mechanism according to the present exemplary embodiment includes the front door engagement member 38 coupled to the front door 19, a slide member 60 movable in the horizontal direction, and a cam engagement member 61 engaging with the front cam 34 to cause the front cam 34 to pivot.

In the present exemplary embodiment, the cam engagement member 61 is pivotably coupled to a shaft 60A of the slide member 60. More specifically, the cam engagement member 61 is coupled to the slide member 60 so as to be pivotable about an axis orthogonal to the rotation axis of the pressure roller 11. Another member may be pivotably coupled between the cam engagement member 61 and the slide member 60. Further, the cam engagement member 61 includes a guide boss 61A and an engagement portion 61B for engagement with the front cam 34. The front cam 34 includes the boss 34C for engagement with the engagement portion 61B, and the boss 34C is extended. The guide boss 61A and the boss 34C of the front cam 34 are arranged so as to be orthogonal to each other, and the guide boss 61A engages with a guide groove 62 provided in the image forming apparatus main body. The slide member 60 is held by a part (not illustrated) to be movable in the horizontal direction in the image forming apparatus main body.

Figure 16A:
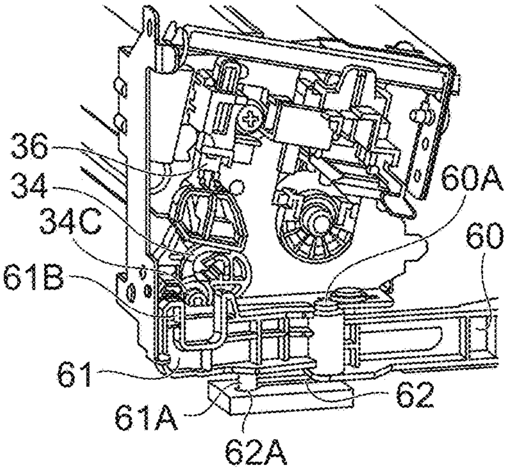
FIGS. 16A, 16B, and 16C are perspective views illustrating operation of a cam engagement member and the pressure releasing mechanism.
Figure 16B:
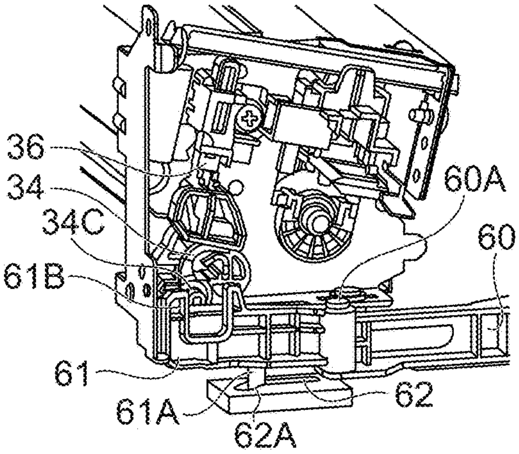
Figure 16C:
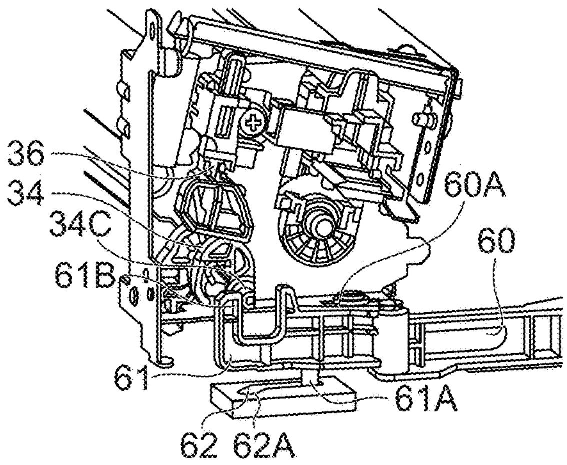
Figure 17A:
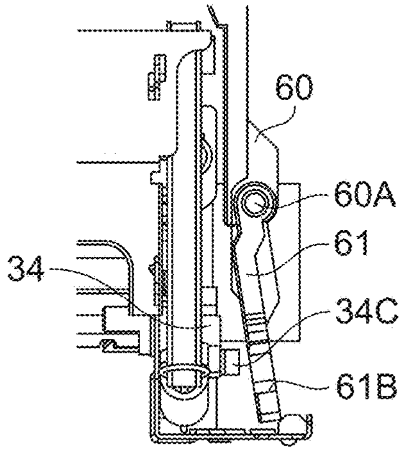
FIGS. 17A, 17B, and 17C are top views illustrating operation of the cam engagement member and the pressure releasing mechanism.
Figure 17B:
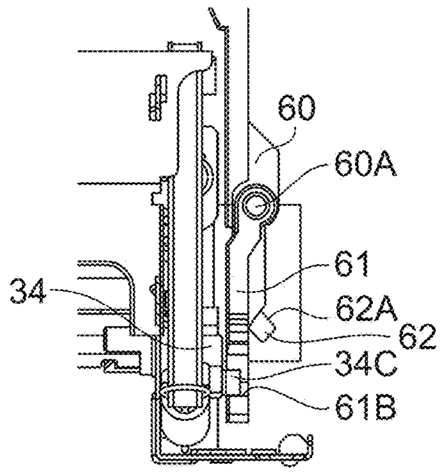
Figure 17C:
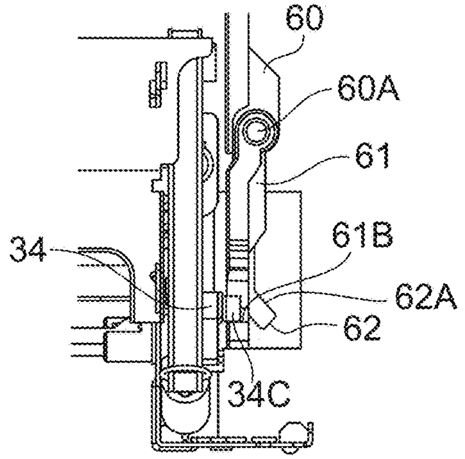

FIGS. 16A to 16C are perspective views illustrating operation of the cam engagement member 61 and the pressure releasing mechanism. FIGS. 17A to 17C are top views as viewed from above the main body. FIG. 16A and FIG. 17A are diagrams when the front door 19 is in the closed state. FIG. 16B and FIG. 17B are diagrams in a state where the cam engagement member 61 and the front cam 34 start to engage with each other. FIG. 16C and FIG. 17C are diagrams when the front door 19 is in the open state. When the front door 19 is in the closed state, the engagement portion 61B of the cam engagement member 61 is at a position separated from the boss 34C of the front cam 34 as illustrated in FIG. 16A. When the slide member 60 starts a horizontal movement, the guide boss 61A moves along an inclined surface 62A of the guide groove 62, and the cam engagement member 61 accordingly moves and pivots about the shaft 60A of the slide member 60 while horizontally moving. As a result, the engagement portion 61B moves in a direction approaching the fixing device 9, comes into contact with the boss 34C of the front cam 34, which leads to a state illustrated in FIG. 16B. When the slide member 60 further horizontally moves, the guide boss 61A of the cam engagement member 61 moves along a perpendicular portion of the guide groove 62, and the cam engagement member 61 horizontally moves integrally with the slide member 60. At this time, the engagement portion 61B of the cam engagement member 61 causes the front cam 34 to pivot. Finally, the slide member 60 completes moving the predetermined distance L1 in the same manner as in FIG. 9C according to the first exemplary embodiment, which leads to a non-pressurized state illustrated in FIG. 16C.

Figure 18A:
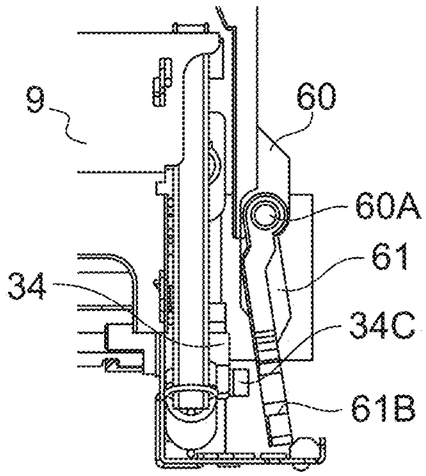
FIGS. 18A, 18B, and 18C are explanatory views illustrating an attachment/detachment locus of the fixing device according to a second exemplary embodiment.
Figure 18B:
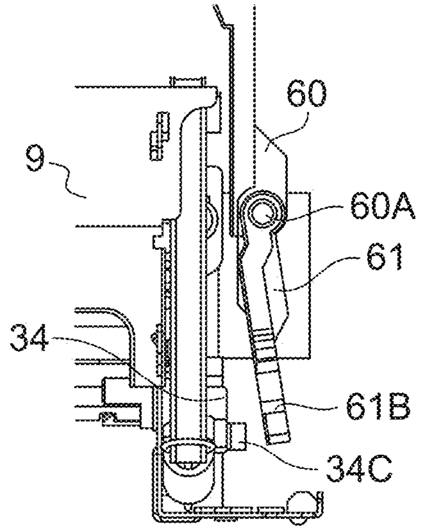
Figure 18C:
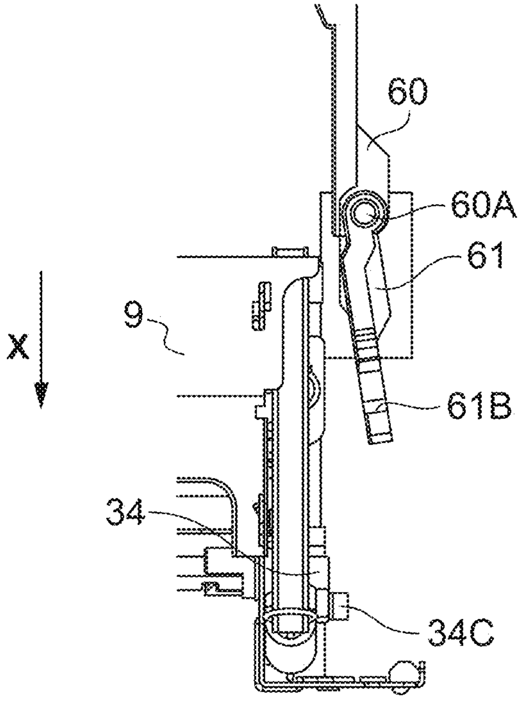

In a case where the front door 19 is moved from the open state to the closed state, operation opposite to the operation described so far is performed. As described so far, when the front door 19 illustrated in FIG. 16A and FIG. 17A is in the closed state, the engagement mechanism (cam engagement member 61) is at a position retreated from an attachment/detachment path of the fixing device 9. Therefore, the fixing device 9 is attachable or detachable in the X direction as illustrated in FIGS. 18A to 18C. The fixing device 9 is replaceable without the user having to disengage the engagement portion between the engagement mechanism and the fixing device 9 and without impairing usability.

Further, the pressure releasing mechanism according to the present exemplary embodiment operates in conjunction with the front door 19 and the rear door 20 independently from each other. Therefore, regardless of whether the pressure releasing mechanism operating in conjunction with the rear door 20 is in the pressurized state or the non-pressurized state, the fixing device 9 can be attached or detached while the front door 19 is in the closed state. Further, in the present exemplary embodiment, the cam engagement member 61 is at the position completely retreated from the attachment/detachment path of the fixing device 9. However, the cam engagement member 61 may not be at the position completely retreated from the path. For example, in a detachment process of the fixing device 9, the front cam 34 may push the cam engagement member 61 to pivot, thereby retreating the cam engagement member 61 from the attachment/detachment path.

In the present exemplary embodiment, the configuration including, as the engagement mechanism that engages with the fixing device 9 and operates in conjunction with the front door 19, three parts, namely the front door engagement member 38, the slide member 60, and the cam engagement member 61, has been described. However, the number of parts constituting the engagement mechanism is not limited to three. Thus, the functions, materials, shapes, arrangement, and the like of the components described in the above-described exemplary embodiment do not limit the present disclosure and can be appropriately changed within the spirit of the present disclosure, unless otherwise specified.

ADDITIONAL STATEMENT

The above-described exemplary embodiments discuss at least an image forming apparatus described below.

(Item 1)

1. An image forming apparatus comprising:

a fixing unit configured to fix a toner image formed on a sheet onto the sheet, wherein the fixing unit includes a heating unit configured to heat the sheet, a pressure member configured to come into pressure contact with the heating unit to form a fixing nip portion for performing fixation, an urging member configured to apply urging force to bring the pressure member and the heating unit into pressure contact with each other, and a pressure releasing mechanism configured to reduce or release the urging force applied to the fixing nip portion; and an apparatus main body configured to detachably house the fixing unit, wherein the apparatus main body includes a first opening/closing member provided to be openable/closable to a first opening of the apparatus main body, an engagement mechanism engaging with the pressure releasing mechanism and the first opening/closing member and operate in conjunction with opening/closing of the first opening/closing member, and a second opening for attachment/detachment of the fixing unit, wherein, in a state where the first opening/closing member is closed, the urging member applies the urging force to the fixing nip portion, and by the engagement mechanism moving in a process in which the first opening/closing member is opened from a closed state, the pressure releasing mechanism reduces or releases the urging force applied to the fixing nip portion, wherein the engagement mechanism includes a first engagement portion, and the pressure releasing mechanism includes a first engaged portion engaging with the first engagement portion, wherein, in the process in which the first opening/closing member is opened from the closed state, the first engagement portion positioned on a second opening side of the first engaged portion pushes the first engaged portion from the second opening side to reduce or release the urging force applied to the fixing nip portion, and wherein, in the state where the first opening/closing member is closed, the first engagement portion and the first engaged portion are disengaged, and the first engagement portion is retreated from a path of the first engaged portion when the fixing unit is detached from the second opening.

(Item 2)

2. The image forming apparatus according to Item 1, wherein, in the process in which the first opening/closing member is opened, the first engagement portion engages with the first engaged portion.

(Item 3)

3. The image forming apparatus according to Items 1 and 2, wherein the engagement mechanism includes a second engagement portion, and the pressure releasing mechanism includes a second engaged portion that is positioned on the second opening side of the second engagement portion, and wherein, in a process in which the first opening/closing member is closed, the second engagement portion engages with the second engaged portion, and by the second engagement portion pushing the second engaged portion, the urging force is applied to the fixing nip portion.

(Item 4)

4. The image forming apparatus according to Items 1 to 3, wherein the first engagement portion is positioned on the second opening side of the second engagement portion.

(Item 5)

5. The image forming apparatus according to Items 1 to 4, wherein the pressure releasing mechanism includes a pivotable cam member configured to adjust the urging force by acting on the urging member, and the cam member includes the first engaged portion.

(Item 6)

6. The image forming apparatus according to Items 1 to 5, wherein the pressure member is a pressure roller having a rotation axis, and wherein the engagement mechanism includes a slide member held to be movable in a horizontal direction in response to opening/closing of the first opening/closing member, and includes a swing member that includes the first engagement portion and is held by the slide member to be pivotable about an axis parallel to the rotation axis of the pressure roller.

(Item 7)

7. The image forming apparatus according to Items 1 to 5, wherein the pressure member is a pressure roller including a rotation axis, and wherein the engagement mechanism includes a slide member held to be movable in a horizontal direction in response to opening/closing of the first opening/closing member, and includes a swing member that includes the first engagement portion and is held to the slide member, to be pivotable about an axis orthogonal to the rotation axis of the pressure roller.

(Item 8)

8. The image forming apparatus according to Items 1 to 7, wherein the apparatus main body includes a second opening/closing member for jam recovery at the fixing nip portion at a position covering at least a part of the second opening, and wherein an opening/closing operation of the second opening/closing member reduces or releases the urging force applied to the fixing nip portion by being in conjunction with the pressure releasing mechanism.

(Item 9)

9. The image forming apparatus according to Item 8, wherein the opening/closing operation of the second opening/closing member is not in conjunction with the engagement mechanism.

According to the exemplary embodiments, it is possible to provide the image forming apparatus, in the configuration in which the nip of the fixing device is released in conjunction with opening of the door, that includes the fixing device that can be replaced without impairing workability during detachment of the fixing device.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-105936, filed Jun. 28, 2023, which is hereby incorporated by reference herein in its entirety.

What is claimed is:

1. An image forming apparatus comprising:

a fixing unit configured to fix a toner image formed on a sheet onto the sheet, wherein the fixing unit includes a heating unit configured to heat the sheet, a pressure member configured to come into pressure contact with the heating unit to form a fixing nip portion for performing fixation, an urging member configured to apply urging force to bring the pressure member and the heating unit into pressure contact with each other, and a pressure releasing mechanism configured to reduce or release the urging force applied to the fixing nip portion; and an apparatus main body configured to detachably house the fixing unit, wherein the apparatus main body includes a first opening/closing member provided to be openable/closable to a first opening of the apparatus main body, an engagement mechanism engaging with the pressure releasing mechanism and the first opening/closing member and operate in conjunction with opening/closing of the first opening/closing member, and a second opening for attachment/detachment of the fixing unit, wherein, in a state where the first opening/closing member is closed, the urging member applies the urging force to the fixing nip portion, and by the engagement mechanism moving in a process in which the first opening/closing member is opened from a closed state, the pressure releasing mechanism reduces or releases the urging force applied to the fixing nip portion, wherein the engagement mechanism includes a first engagement portion, and the pressure releasing mechanism includes a first engaged portion engaging with the first engagement portion, wherein, in the process in which the first opening/closing member is opened from the closed state, the first engagement portion positioned on a second opening side of the first engaged portion pushes the first engaged portion from the second opening side to reduce or release the urging force applied to the fixing nip portion, wherein, in the state where the first opening/closing member is closed, the first engagement portion and the first engaged portion are disengaged, and the first engagement portion is retreated from a path of the first engaged portion when the fixing unit is detached from the second opening, wherein the engagement mechanism includes a second engagement portion, and the pressure releasing mechanism includes a second engaged portion that is positioned on the second opening side of the second engagement portion, and wherein, in a process in which the first opening/closing member is closed, the second engagement portion engages with the second engaged portion, and by the second engagement portion pushing the second engaged portion, the urging force is applied to the fixing nip portion.

2. The image forming apparatus according to claim 1, wherein, in the process in which the first opening/closing member is opened, the first engagement portion engages with the first engaged portion.

3. The image forming apparatus according to claim 1, wherein the first engagement portion is positioned on the second opening side of the second engagement portion.

4. The image forming apparatus according to claim 1, wherein the pressure releasing mechanism includes a pivotable cam member configured to adjust the urging force by acting on the urging member, and the cam member includes the first engaged portion.

5. The image forming apparatus according to claim 1, wherein the pressure member is a pressure roller having a rotation axis, and wherein the engagement mechanism includes a slide member held to be movable in a horizontal direction in response to opening/closing of the first opening/closing member, and includes a swing member that includes the first engagement portion and is held by the slide member to be pivotable about an axis parallel to the rotation axis of the pressure roller.

6. The image forming apparatus according to claim 1, wherein the pressure member is a pressure roller including a rotation axis, and wherein the engagement mechanism includes a slide member held to be movable in a horizontal direction in response to opening/closing of the first opening/closing member, and includes a swing member that includes the first engagement portion and is held to the slide member, to be pivotable about an axis orthogonal to the rotation axis of the pressure roller.

7. The image forming apparatus according to claim 1, wherein the apparatus main body includes a second opening/closing member for jam recovery at the fixing nip portion at a position covering at least a part of the second opening, and wherein an opening/closing operation of the second opening/closing member reduces or releases the urging force applied to the fixing nip portion by being in conjunction with the pressure releasing mechanism.

8. The image forming apparatus according to claim 7, wherein the opening/closing operation of the second opening/closing member is not in conjunction with the engagement mechanism.

* * * * *